March 2, 1971  K. A. HEWITT  3,566,540
VEHICULAR DOOR GLASS STABILIZING MECHANISM
Filed Aug. 15, 1969  2 Sheets-Sheet 1

INVENTOR.
Keith A. Hewitt
BY
Harness Dickey & Baldwin
ATTORNEYS.

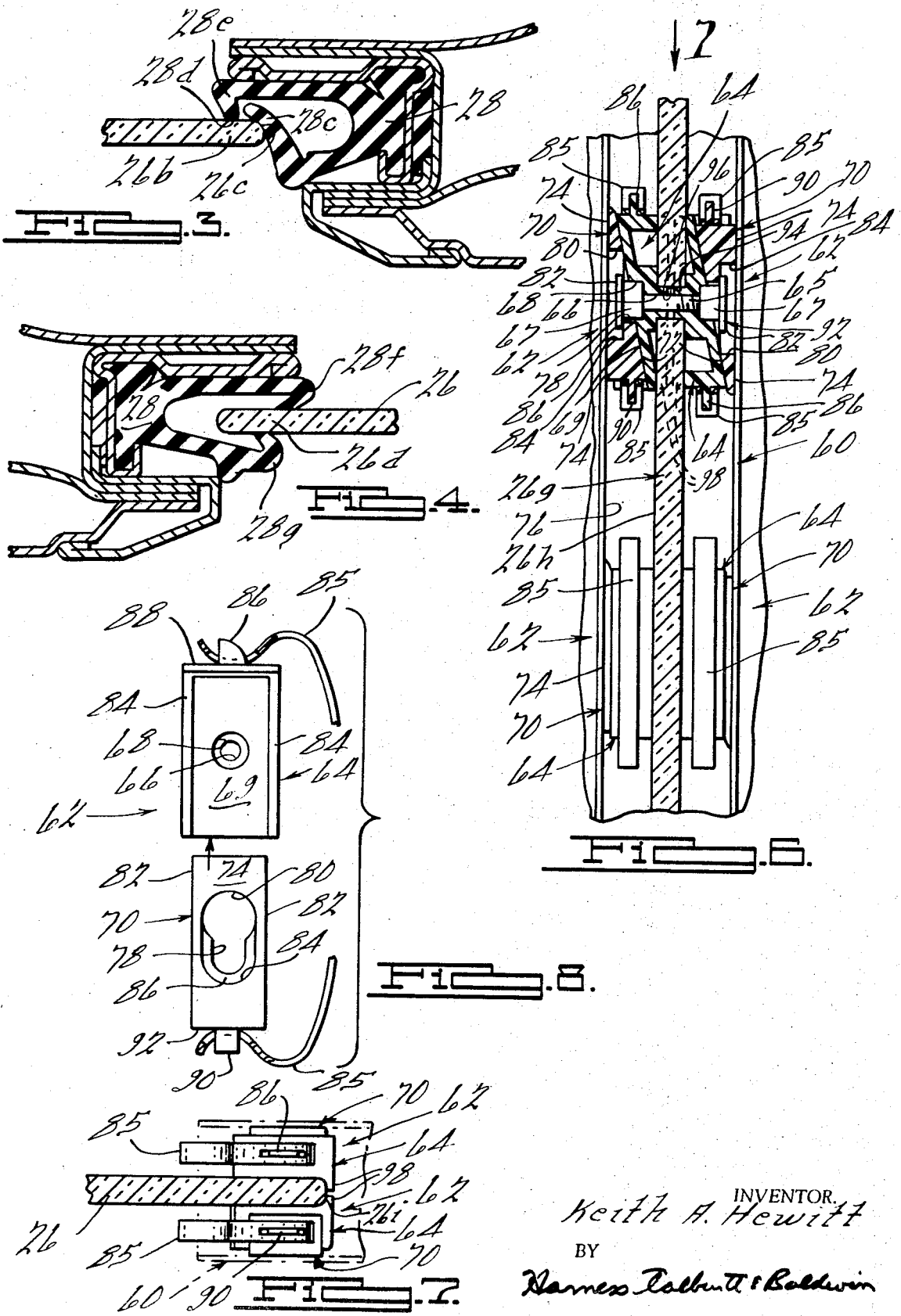

United States Patent Office 3,566,540
Patented Mar. 2, 1971

3,566,540
VEHICULAR DOOR GLASS STABILIZING
MECHANISM
Keith A. Hewitt, Highland, Mich., assignor to Chrysler
Corporation, Highland Park, Mich.
Filed Aug. 15, 1969, Ser. No. 850,428
Int. Cl. E05d 15/16
U.S. Cl. 49—417                                                17 Claims

ABSTRACT OF THE DISCLOSURE

A stabilizer mechanism for the tailgate window glass of a station wagon type motor vehicle wherein the side edges of the glass are slideably received in channel members positioned vertically within the door and coacting wedge assemblies positioned in the lateral spaces between the window glass and the channel members, are arranged to be expanded by a spring to a thickness to fill these lateral spaces in any static position of the door and to undergo a contraction in their thickness in response to movement of the glass in either direction to thereby ease the glass movement; each wedge assembly comprises a first wedge piece secured to the glass and a second wedge piece mounted on the first piece for limited vertically sliding movement on that piece to selectively increase or decrease the combined thickness of the two pieces and thereby either stabilize or free up the glass.

BACKGROUND OF INVENTION

This invention relates to stabilizer mechanisms for the window glass of motor vehicle doors. More particularly, it relates to a window glass stabilizer mechanism for the tailgate window glass of a station wagon type motor vehicle. In the past, the tailgate window glass has been received in its raised position in a rigid channel defined on the vehicle body around the upper portion of the tailgate opening; this channel held the window glass firmly in its raised position so that there was no need for a special stabilizer mechanism.

However, more recent tailgate design provides a tailgate which opens as a door about a generally vertical axis and which may be so opened with the window glass in its raised position. This feature has necessitated that the tailgate glass be of the hardtop type in which the glass merely presses in its raised position against a sealing gasket around the window opening so that the glass is supported only from below by the portion of the glass remaining within the gate. With this design, it is necessary that specific provision be made within the gate to stabilize the glass in any of its raised positions. This invention provides such a stabilizer provision.

SUMMARY OF THE INVENTION

It is an obect of the present invention to provide a novel stabilizer mechanism for the window glass of a vehicle door of the hardtop type.

A more specific object is to provide a novel stabilizer mechanism for the window glass of the tailgate of a station wagon type motor vehicle.

In the stabilizer mechanism of the invention, stationary door surfaces are provided within the tailgate spaced laterally from either side surface of the glass to define a lateral space at either side of the glass bounded by confronting door and glass surfaces, and stabilizer means are interposed in each of these lateral spaces; the stabilizer means are operative in any static position of the glass to expand to the combined thickness of the lateral spaces, whereby to firmly fill these spaces and stabilize the glass relative to the tailgate, and are operative in response to an upward or downward force exerted on the glass by the window regulator mechanism to contract to a combined thickness less than the combined lateral space thickness to allow the glass to move freely up and down within the tailgate.

In the disclosed embodiment of the invention, each stabilizer means includes an inner wedge piece secured to the glass and an outer wedge piece mounted on the inner wedge piece for limited vertically sliding movement on that piece to selectively increase or decrease the effective combined thickness of the pieces. The angled cam interface of the two wedge pieces on one side of the glass slopes downwardly and inwardly relative to the glass, and the angled interface of the two wedge pieces on the other side of the glass slopes downwardly and outwardly relative to the glass. Springs act to continually urge the wedge pieces of each pair to undergo relative sliding movement in a direction to increase their effective combined thickness and thereby fill the lateral spaces at each side of the glass to stabilize the glass within the gate. When the glass is moved upwardly by the regulator mechanism, the outer wedge piece of the wedge pair having the inwardly angled cam interface is retarded by its frictional engagement with the adjacent door surface and moves downwardly relative to the inner wedge piece against the spring bias to reduce the combined thickness of that wedge pair and allow the window to move freely upwardly within the door; when the glass is moved downwardly, the outer wedge of the wedge pair having the outwardly angled cam interface is similarly frictionally retarded relative to the inner wedge piece against the spring bias to reduce the combined thickness of that wedge pair and allow the window to move freely downwardly within the door.

These and other objects, features and advantages of the invention will be apparent from the accompanying drawings and from the detailed description of the preferred embodiment.

BRIEF DESCRIPTION OF THE DRAWINGS

The preferred embodiment of the invention is illustrated in the accompanying drawings in which:

FIGS. 2, 3 and 4 are cross sectional views taken on lines 2—2, 3—3, and 4—4, respectively, of FIG. 1;

FIGS. 5 and 6 are views on an enlarged scale of the structures within the circles 5 and 6 respectively, of FIG. 2;

FIG. 7 is a view looking in the direction of the arrow 7 in FIG. 6; and

FIG. 8 is an exploded view of a portion of the invention stabilizer mechanism.

DETAILED DESCRIPTION OF THE PREFERRED EMBODIMENT

Figure 1:
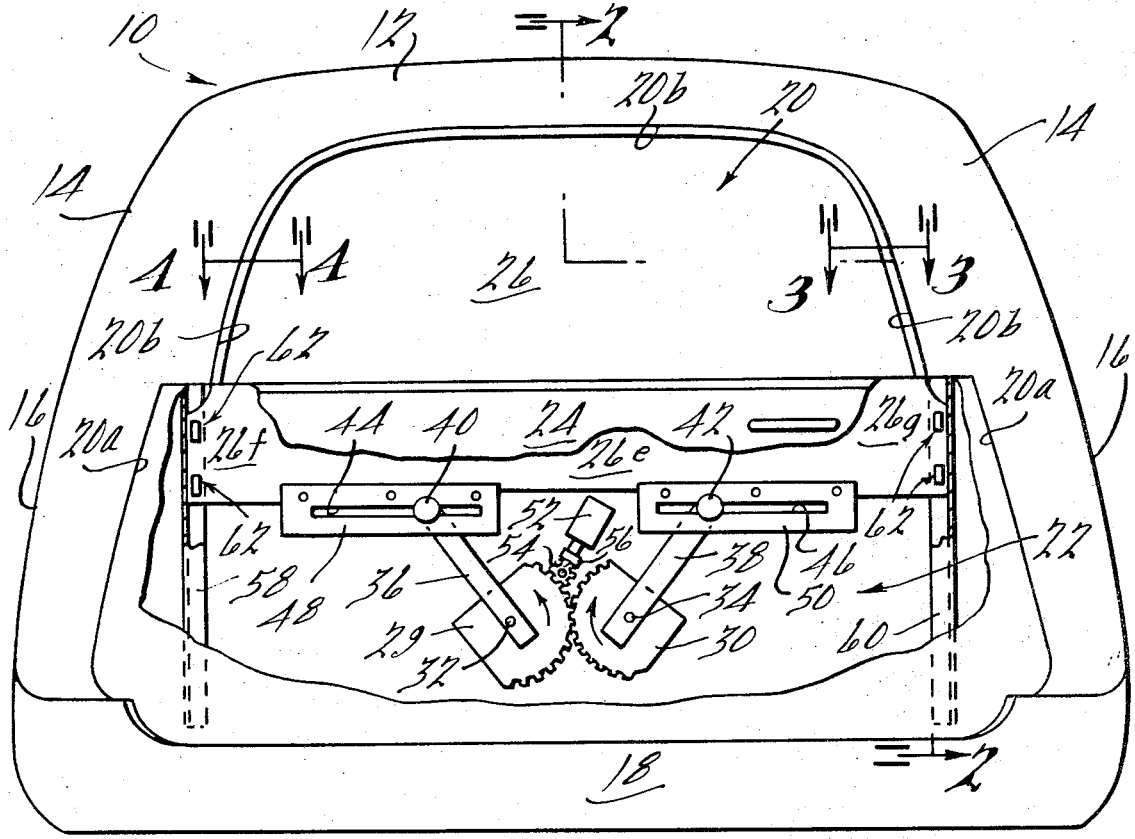
FIG. 1 is a partially fragmentary rear view of a motor vehicle of the station wagon type embodying the window glass stabilizer mechanism of the invention.

The station wagon type motor vehicle seen fragmentarily in FIG. 1 includes a body structure 10 including a roof panel 12, rear pillars 14, rear quarter panels 16, and bumper 18; the roof panel, rear pillars, and quarter panels together define a rear door opening 20 which is closed by a tailgate seen generally at 22. Tailgate 22 is preferably of the "double acting" or "two way" type in which the gate is mounted by double axis hinge means (not shown) for selective opening movement either downwardly as a gate about a generally horizontal axis adjacent the bottom of the tailgate or outwardly as a door about a generally vertical axis adjacent a side edge of the tailgate. (The vertical or "door" axis for the gate of FIG. 1 would be located adjacent the left side edge of the gate.)

Tailgate 22 includes a main gate structure 24 of a size and shape to close the lower portion 20a of door opening 20, and a window glass 26 carried by gate structure 24 and adapted in its raised position to close the upper portion 20b of door opening 20. Window glass 26 is mounted for movement within gate structure 24 between the raised position of FIG. 1 and a lowered position (not shown) in which the glass is completely stowed within gate structure 24. With the glass in its raised position, the glass edge sealingly coacts with a resilient gasket member 28 of varying cross sectional construction carried by the body structure.

The sealing coaction of the top edge 26a of the raised glass with the adjacent gasket section is seen in FIG. 5 wherein the forward face of top glass edge 26a is seen pressing against a first finger portion 28a of gasket 28 and a second finger portion 28b is seen pressing resiliently against the rearward face of wedge portion 26a.

Figure 3:
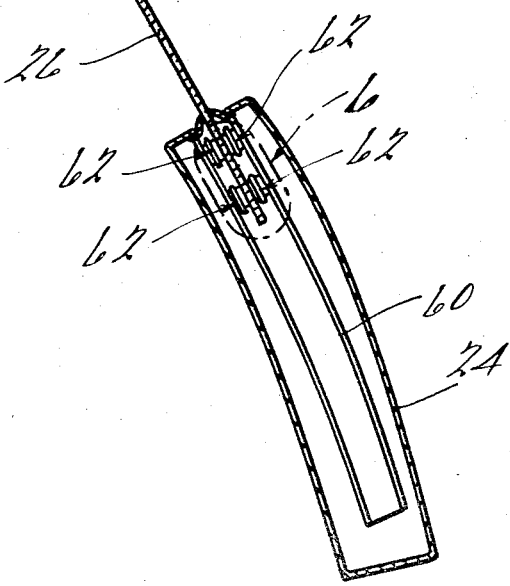

The coaction of the upper right edge portion 26b of glass 26 with the adjacent gasket section is seen in FIG. 3 wherein the side edge 26c of side glass edge portion 26b is seen pressing against a first gasket finger portion 28c and the forward face of the glass is seen pressing against the tip end 28d of a second gasket finger portion 28e.

The coaction of the upper left edge portion 26d of glass 26 with the adjacent gasket section is seen in FIG. 4 wherein wedge portion 26d is seen received between first and second finger portions 28f and 28g with the tip end of finger portion 28f pressing against the forward glass face and the tip end of finger portion 28g pressing against the rearward glass face.

Glass 26 is selectively moved between its raised and lowered positions by a window regulator mechanism of known form. In the disclosed embodiment, the regulator mechanism is of the power actuated type and includes intermeshing gear sectors 29, 30, pivotally mounted at 32, 34 on gate structure 24, drive arms 36, 38 fixedly secured to sectors 29, 30 and carrying rollers 40, 42 at their free ends guiding in slots 44, 46 in track members 48, 50 fixed to the lower edge portion 26e of the window glass, a reversible electric drive motor 52, and a pinion gear 54 meshing with gear sector 29 and driven from motor 52 through a suitable gear reduction unit 56. Selective actuation of motor 52 selectively raises and lowers window glass 26; a suitable counter-balance device (not shown) enables the regulator mechanism to readily move the window glass and firmly hold the glass in any position of adjustment.

Figure 2:
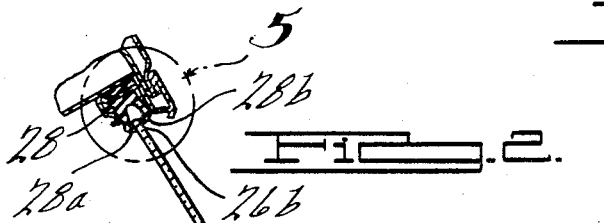

The movement of the window glass between its raised and lowered positions is guided and defined by a pair of channel members 58, 60 fixedly secured within gate structure 24 in generally vertical positions. Channels 58, 60 are arcuate to conform to the curvature of the window glass and open toward one another to slideably receive the respective lower side edge portions 26f, 26g of the window glass. A plurality of stabilizer assemblies 62 (seen in assembled relation to the over-all tailgate structure in FIG. 2 and in detail in FIGS. 6, 7 and 8) serve to stabilize the window glass in any position of vertical adjustment.

Each stabilizer assembly 62 comprise coacting wedge pieces positioned in the lateral space defined at either side of the related glass edge portions between the inner surface of the related guide channel and the confronting glass surface. A pair of stabilizer assemblies 62 is positioned at opposite sides of lower glass side edge portion 26f and a second pair of stabilizer assemblies is positioned on edge portion 26f in vertically spaced relation to the first pair; similarly, two pairs of stabilizer assemblies are positioned in vertically spaced relation to one another on edge portion 26g. The stabilizer assemblies seen in cross sectional detail in FIG. 6 (which will now be described with reference also to stabilizer details seen in FIGS. 7 and 8) comprise the upper pair of stabilizer assemblies on glass edge portion 26g.

The left-hand, upper stabilizer assembly 62 as seen in FIG. 6 includes an inner wedge piece 64 of a suitable plastic material such as nylon fixedly secured to the forward face 26h of glass edge portion 26g by a bolt 65 passing through a central bore 66 in wedge piece 64 and having a shoulder portion 67 seating in a countersunk bore 68 opening in a cam surface 69. Thus secured, cam face 69 is disposed in inclined relation to the generally vertical orientation of the glass and guide channels. A second or outer wedge piece 70, which may also be of nylon or a similar plastics material, has an inclined cam face 72 which is complementary to cam face 68 so that, with cam faces 68, 72 in confronting relationship, the base surface 74 of wedge piece 70 is generally parallel to the adjacent inner surface 76 of channel 60. A slot 78 in wedge piece 70 coacts with shoulder portion 67 of bolt 66 to provide limited sliding movement of outer wedge piece 70 relative to inner wedge piece 64. Slot 78 is enlarged at one end at 80 to allow passage of the enlarged bolt head 82 for assembly purposes, and includes a countersunk portion 84 defining a U-shaped shoulder surface 86 coacting with the underside of bolt head 82 to limit laterally outward movement of ourter wedge piece 70 relative to wedge piece 64. Wedge piece 70 is seen in FIG. 6 near its extreme upper position relative to wedge piece 64; slot 78 allows wedge piece 70 to undergo considerable downward movement relative to wedge piece 64 from its position of FIG. 6. This downward movement is guided by slideable coaction of bolt shoulder portion 67 in slot 78 and slideable coaction of wedge side edge surfaces 82 with ribs 84 on wedge piece 64 flanking cam surface 69. A C-shaped spring 85 has a slot at one end fitting over a tab 86 extending upwardly from the top surface 88 of inner wedge piece 64, and a slot at the other end of spring 84 fits over a tab 90 extending downwardly from the bottom surface 92 of outer wedge piece 70. Spring 84 squeezes wedge pieces 64, 70 together and continuously urges wedge piece 70 to move upwardly on wedge piece 64; since the cam interface of wedge pieces 64, 70 is inclined downwardly and inwardly relative to the glass surface, this upward movement of outer wedge 70 on inner wedge 64 increases the effective thickness of the stabilizer assembly.

The stabilizer assembly 62 on the upper right-hand side of window glass 26 in FIG. 6 is identical to the previously described assembly on the left-handside of glass 26 except that the right-hand assembly is upside down with respect to the lefthand assembly so that spring 85 continuously urges wedge piece 70 to move downwardly relative to wedge piece 64. In upper right-hand assembly 62, bolt shoulder portion 67 and bold head 82 are provided by a nut 92 screwed onto bolt 66. The left and right stabilizer assemblies are assembled to the glass as a coacting pair with pilot portions 94 on the confronting base surfaces of the two wedge pieces 64 received in the opposite ends of a locating bore 96 in the glass, and flange portions 98 on wedge pieces 64 lapped over the glass edge 26i to preclude canting movement of the wedge pieces relative to the glass. The left and right stabilizer assemblies 62 positioned on window glass side edge portion 26g in downwardly spaced relation from the described stabilizer assemblies are identical in structure and orientation to the corresponding assemblies on glass edge portion 26g.

OPERATION OF THE PREFERRED EMBODIMENT

Stabilizer assemblies 62 operate to stabilize glass 26 in any adjusted position of the glass. Assemblies 62 act in pairs to accomplish this stabiliber function by expanding to completely fill up the lateral spaces defined on either side of the glass between the inner surfaces 76 of the guide channel and the confronting side surfaces of the glass edge portions received slideably between the channels. Thus, the two upper stabilizer assemblies 62 in FIG. 6 coact to fill the lateral spaces at either side of the glass with the left assembly 62 expanding under the urging of the spring 85 to increase its effective thickness to an extent to firmly abut the confronting inner channel surface 76 and the right assembly 62 similarly expanding under the urging of the spring 85 to move into abutting engagement with the confronting inner channel surface. The expansion is acomplished in each case as sliding movement of the outer cam 70 on inner cam 64 in a direction to increase the over-all thickness of the assembly. In the left assembly 62 of FIG. 6, outer cam 70 moves upwardly on inner cam 64 to increase the assembly thickness; in the right assembly, the outer cam moves downwardly on the inner cam to increase the assembly thickness. The upper stabilizer assemblies of FIG. 6 thus coact with the lower stabilizer assemblies in that figure to stabilize glass edge portion 26g in channel 60; the upper and lower stabilizer pairs on the left edge portion 26f similarly expand to stabilize that edge of the glass in channel 58. Stabilizers 62 thus function to hold glass 26 fixedly within channels 58, 60 to substantially preclude fore and aft movement of the unrestrained upper portion of the glass.

When a force is exerted on the windor glass through the regulating mechanism, stabilizers 62 function in pairs to decrease their effective pair thickness and allow the glass to move freely in the guide channels. Specifically, if a force is exerted on glass 26 in a direcction to move the glass upwardly, as the glass moves incrementally upwardly the outer wedge 70 of the upper left stabilizer assembly in FIG. 6 slides downwardly relative to the inner wedge 64 against the bias of spring 85 due to the frictional drag at the interface of channel surface 76 and wedge surface 74. The resultant decrease in thickness of left assembly 62 is at first compensated by an increase in the thickness of the right assembly 62 since glass 26 tends to shift to the left as the left assembly decreases in thickness thereby allowing the spring 85 of the right assembly to move the outer wedge 70 of the right assembly downwardly on the inner wedge to increase the assembly thickness. The increase in thickness of the right assembly is quickly terminated, however, by the abutting engagement of the end of slot 78 with bolt shoulder portion 67. As the left assembly continues to decrease in thickness upon further incremental upward movement of the glass, the over-all thickness of the assembly pair decreases to an extent to allow the glass to move freely upwardly within the guide channels. When the window glass stops after reaching its new adjusted position, springs 85 act to expand the wedge assemblies and again completely fill the lateral spaces at either side of the glass to re-establish glass stability.

If a force is now exerted on glass 26 in a direction to move the glass downwardly, as the glass moves incrementally downwardly the outer wedge of the upper right stabilizer assembly in FIG. 6 moves upwardly relative to the inner wedge against the spring bias; after a period of compensating expansion of the left assembly during the initial portion of the dowward movement, continued upward movement of the outer wedge of the right assembly relative to the inner wedge decreases the over-all assembly thickness and frees up the glass within the guide channels to allow it to move freely downward to a new position of adjustment. The lower stabilizer assembly pair of FIG. 6 and the two stabilizer pairs at the other edge 26f of the glas swill be understood to coact in the manner described with reference to the upper assembly pair in FIG. 6.

Although a preferred embodiment of the invention has been illustrated and described in detail with reference to the accompanying drawings, it will be understood that various changes may be made in the disclosed embodiment without departing from the scope or spirit of the invention.

I claim:

1. In a motor vehicle door of the hardtop type in which the window glass is raised and lowered by a window regulator mechanism and the glass in the raised position is supported only from below by the portion thereof remaining within the door; a window glass stabilizer mechanism comprising
   (A) means defining a stationary door surface spaced laterally from either side surface of said glass within said door to define a lateral space at either side of said glass bounded by confronting door and glass surfaces;
   (B) stabilizer means interposed in each of said spaces and operative
      (1) in any static position of said glass within said door, to expand to a combined thickness equal to the combined thickness of said lateral spaces, whereby to firmly fill said spaces and stabilize said glass relative to said door, and
      (2) in response to an upward or downward force exerted on said glass by said regulator mechanism, to contract to a combined thickness less than said combined space thickness to allow said glass to move freely up or down within said door.

2. A glass stabilizer mechanism according to claim 1 wherein
   (B) each of said stabilizer means comprises a first wedge piece fixed to one of said confronting surfaces and a second complementary wedge piece carried by said first wedge piece and slideably engaging the other of said confronting surfaces.

3. A glass stabilizer mechanism according to claim 2 wherein, with respect to each of said stabilizer means:
   (C) said first wedge piece includes an inclined cam face disposed in facing relation to the said other confronting surface
   (D) said second wedge piece defines at its one side an inclined cam face slideably mounted on the inclined cam surface of said first wedge piece and a base surface at its other side for sliding coaction with said other confronting surface.

4. A glass stabilizer mechanism according to claim 3 wherein, with respect to each of said stabilizer means:
   (E) a lost motion connection is provided between said first and second wedge pieces allowing a limited amount of movement of said second wedge piece on said first wedge piece occurring as relative sliding movement of said slideably coacting cam faces.

5. A glass stabilizer mechanism according to claim 4 wherein, with respect to each of said stabilizer means:
   (F) said first and second wedge pieces are configured and arranged such that the combined thickness thereof is increased in response to sliding movement of said second wedge piece in one direction on said first wedge piece and is decreased in response to sliding movement of said second wedge piece in its opposite direction on said first wedge piece.

6. A glass stabilizer mechanism according to claim 5 and further including for each stabilizer means:
   (G) spring means continuously biasing said second wedge piece for movement in said one direction on said first wedge piece, whereby to increase the effective thickness of said piece and completely fill the lateral space between said confronting surfaces to stabilize said glass.

7. A glass stabilizer mechanism according to claim 6 wherein, with respect to each of said stabilizer means:
   (H) said spring means resiliently interconnects said wedge pieces.

8. A glass stabilizer mechanism according to claim 7 wherein, with respect to each of said stabilizer means:
   (I) said spring means comprises a C-shaped spring bearing at one end against one end of said first wedge piece and at its other end against the remote end of said second wedge piece.

9. A glass stabilizer mechanism according to claim 6 wherein, with respect to each of said stabilizer means:
   (H) said one confronting surface is the glass surface and said other confronting surface is the door surface.

10. In a motor vehicle door of the hardtop type in which the window glass is raised and lowered by a window regulator mechanism and the glass in its raised position is supported only from below by the portion thereof remaining within the door; a window glass stabilizer mechanism comprising
 (A) means defining a stationary, vertically extending door surface spaced laterally from either side surface of said glass within said door to define a first lateral space at one side of said glass bounded by that glass side surface and the confronting door surface and a second lateral space at the other side of said glass bounded by that glass side surface and the confronting door surface;
 (B) a first stabilizer assembly positioned within said first lateral space and including
  (1) a first wedge piece secured to said one glass side surface and having a cam face angled downwardly and laterally inwardly with respect to said one glass surface,
  (2) a second wedge piece mounted on said first wedge piece for limited vertically sliding movement relative thereto and having a base surface frictionally coacting with the confronting door surface and a cam face slideably coacting with said first wedge piece cam face, and
  (3) spring means continuously urging said second wedge piece for upward sliding movement on said first wedge piece; and
 (C) a second stabilizer assembly positioned within said second lateral space and including
  (1) a third wedge piece secured to said other glass surface and having a cam face angled downwardly and laterally outwardly with respect to said other glass surface;
  (2) a fourth wedge piece mounted on said third wedge piece for limited vertically sliding movement relative thereto and having a base surface frictionally coacting with the confronting door surface and a cam face slideably coacting with said third wedge piece cam face, and
  (3) spring means continuously urging said fourth wedge piece for downward sliding movement on said third wedge piece.

11. A glass stabilizer assembly according to claim 10 wherein
 (D) said first and third wedge pieces are secured to the opposite side surfaces of said glass by a fastener member passing through an aperture in said glass.

12. A glass stabilizer assembly according to claim 11 wherein
 (E) said second and fourth wedge pieces are each provided with a vertically extending slot; and
 (F) said fastener member extends through said first and third wedge pieces to position its end portions in the slots in said second and fourth wedge pieces, respectively, to thereby provide and define the extent of said limited vertically sliding movement.

13. A glass stabilizer assembly according to claim 12 wherein
 (G) each of said second and fourth wedge pieces is cut away adjacent the base surface thereof to define a countersunk shoulder surface flanking each said slot; and
 (H) a head flange having a diameter greater than the width of said slots is provided on each end portion of said fastener member for coaction with said shoulder surfaces to limit laterally outward movement of said second and fourth wedge pieces relative to said first and third wedge pieces, respectively.

14. A glass stabilizer assembly according to claim 13 wherein
 (I) said fastener member includes a bolt member passing through said glass;
 (J) one of said fastener member end portions is formed by the integral head of said bolt members and
 (K) the other of said fastener member end portions is formed by a nut screwed on to the free end of said bolt member.

15. A glass stabilizer mechanism according to claim 10 wherein
 (D) said door surface defining means comprise a pair of tracks of U section positioned generally vertically within said door in laterally spaced relation and opening toward one another to respectively slideably receive the vertical side edge portions of said window glass to provide first and second lateral spaces as aforesaid at either side surface of each of said slideably received side edge portions; and
 (E) first and second stabilizer assemblies as aforesaid are positioned within each of said first and second lateral spaces, respectively.

16. A glass stabilizer assembly according to claim 15 wherein
 (F) said motor vehicle door comprises the tailgate of a station wagon type motor vehicle; and
 (G) said tailgate is mounted for swinging movement on said motor vehicle about a generally vertical hinge axis.

17. A glass stabilizer assembly according to claim 16 wherein
 (F) there are two sets of first and second stabilizer assemblies as aforesaid arranged in vertically spaced relation on each glass side edge portion.

References Cited
UNITED STATES PATENTS

| | | | |
|---|---|---|---|
| 2,015,269 | 9/1935 | Henry | 49—415X |
| 2,673,113 | 3/1954 | Giordano | 49—417X |
| 2,898,984 | 8/1959 | Bianco | 49—439X |
| 3,383,800 | 5/1968 | Sturtevant | 49—440X |
| 3,466,802 | 9/1969 | Doveinis et al. | 49—417X |

DAVID J. WILLIAMOWSKY, Primary Examiner

P. C. KANNAN, Assistant Examiner

U.S. Cl. X.R.

49—349, 374, 423, 438